(12) United States Patent
Mondini et al.

(10) Patent No.: US 12,110,146 B2
(45) Date of Patent: Oct. 8, 2024

(54) APPARATUS FOR HEAT-SEALING A LIDDING FILM TO A SUPPORTING ELEMENT

(71) Applicant: G.MONDINI S.P.A., Cologne (IT)

(72) Inventors: Giovanni Mondini, Cologne (IT); Paolo Carlo Mondini, Cologne (IT)

(73) Assignee: G.MONDINI S.P.A., Cologne (IT)

( * ) Notice: Subject to any disclaimer, the term of this patent is extended or adjusted under 35 U.S.C. 154(b) by 6 days.

(21) Appl. No.: 17/827,236

(22) Filed: May 27, 2022

(65) Prior Publication Data

US 2022/0402638 A1  Dec. 22, 2022

(30) Foreign Application Priority Data

Jun. 17, 2021 (IT) .................. 102021000015857

(51) Int. Cl.
*B65B 7/16* (2006.01)
*B65B 43/42* (2006.01)
*B65B 51/14* (2006.01)
*B65G 17/14* (2006.01)
*B65G 17/32* (2006.01)
*B65G 54/02* (2006.01)

(52) U.S. Cl.
CPC ............ *B65B 51/14* (2013.01); *B65B 7/164* (2013.01); *B65B 43/42* (2013.01); *B65G 54/02* (2013.01); *B65G 2201/0235* (2013.01)

(58) Field of Classification Search
CPC ......... B65B 7/164; B65B 51/14; B65G 17/12; B65G 17/14; B65G 17/32; B65G 17/46; B65G 54/02

USPC ............... 53/329.3; 198/619, 867.15, 803.14
See application file for complete search history.

(56) References Cited

U.S. PATENT DOCUMENTS 4,056,922 A     11/1977  Schilte
9,162,825 B2 *  10/2015  Vaccari ................. B65B 31/028
(Continued)

FOREIGN PATENT DOCUMENTS

DE      102016224951 A2   6/2018
EP          3172134 A1    5/2017
(Continued)

*Primary Examiner* — Thanh K Truong
*Assistant Examiner* — Patrick B Fry
(74) *Attorney, Agent, or Firm* — Pearne & Gordon LLP; J. Gregory Chrisman

(57) ABSTRACT

An apparatus for heat-sealing a lidding film (2) to a supporting element (3), comprising a movement track (5), which extends between an infeed zone and an outfeed zone, a conveying unit (8) and a heat-sealing device (6) which is fitted along the movement track (5), the device (6) comprising a supporting unit (10) and a closing unit (11) which are movable between a home position in which they are at a distance from each other and an operating position in which they are coupled to clamp, in use, the lidding film (2) and a supporting element (3); wherein the conveying unit (8) is configured to support the supporting element (3) and to move and is associable with the movement track (5) for moving on it; the conveying unit (8) comprising one or more active portions (12) which are configured to support the supporting element (3) from below and to couple to the supporting unit (10) to define with it a clamping unit for clamping the supporting element (3) against the closing unit (11).

14 Claims, 13 Drawing Sheets

(56) References Cited

U.S. PATENT DOCUMENTS

| | | | |
|---|---|---|---|
| 9,202,719 B2 | 12/2015 | Lu et al. | |
| 10,144,539 B2 * | 12/2018 | Lang | B65B 51/14 |
| 10,549,878 B2 * | 2/2020 | Ickert | B65B 7/164 |
| 11,091,284 B2 * | 8/2021 | Nakamoto | B65B 43/52 |
| 11,697,556 B2 * | 7/2023 | Kiessner | B65G 35/06 |
| | | | 198/620 |
| 2011/0072764 A1 | 3/2011 | Daniek et al. | |
| 2015/0353216 A1 * | 12/2015 | Siegel | B65B 51/10 |
| | | | 53/427 |
| 2021/0122513 A1 | 4/2021 | Rizzi et al. | |
| 2021/0245960 A1 * | 8/2021 | Kiessner | B65G 43/08 |

FOREIGN PATENT DOCUMENTS

| | | |
|---|---|---|
| EP | 3172156 A1 | 5/2017 |
| EP | 3707808 A1 | 9/2020 |
| JP | S57148619 A | 9/1982 |
| WO | 0159409 A2 | 8/2001 |
| WO | 2016012171 A1 | 1/2016 |
| WO | 2018193382 A1 | 10/2018 |

\* cited by examiner

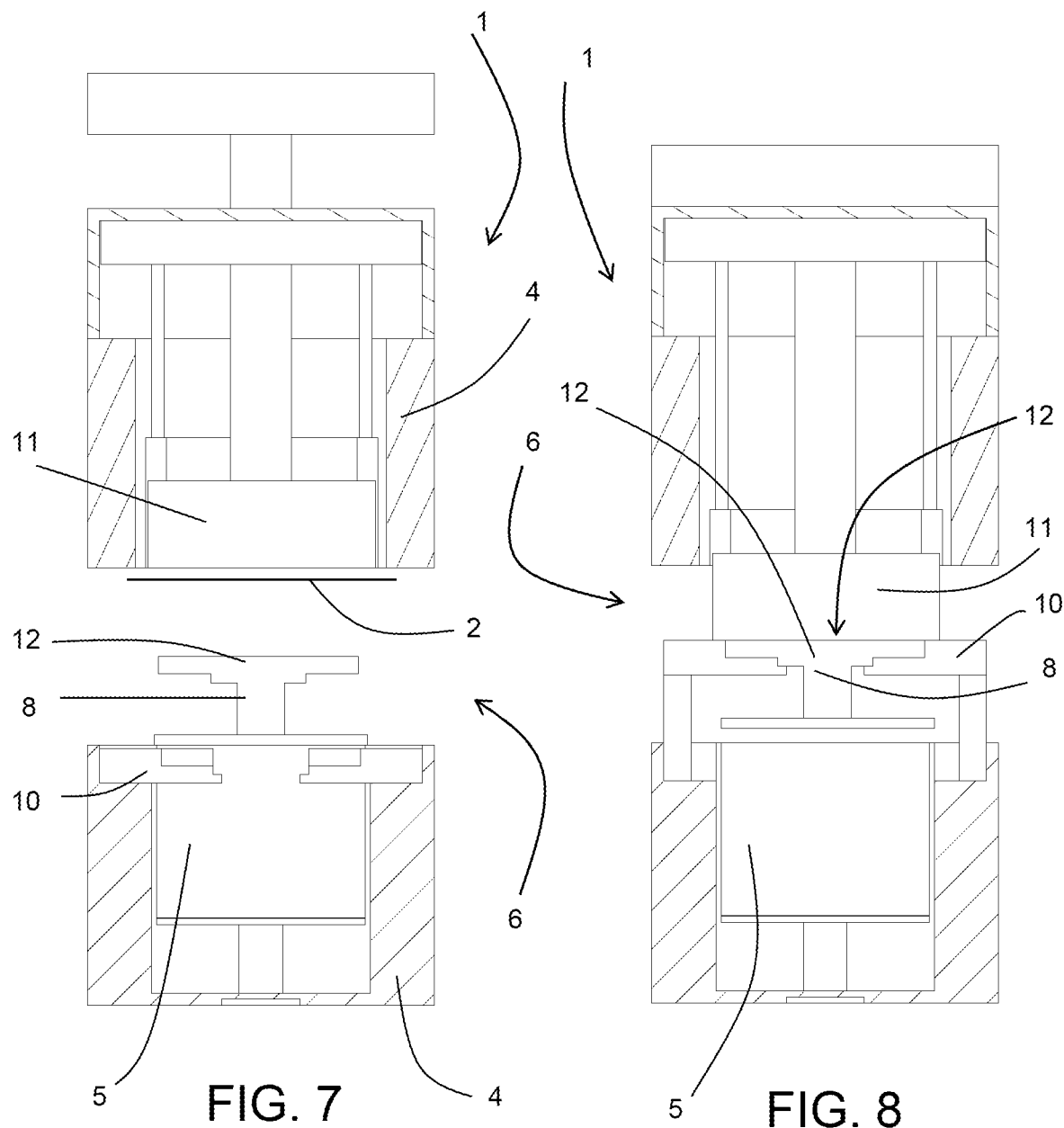

APPARATUS FOR HEAT-SEALING A LIDDING FILM TO A SUPPORTING ELEMENT

This invention relates to an apparatus for heat-sealing a lidding film to a supporting element 3 on which a product is present.

At present, on the market there are many types of apparatuses for heat-sealing lidding film, also known as closing or sealing machines. In fact, there are prior art closing machines which process in a free atmosphere, others which process in a modified atmosphere, others which process in a vacuum and yet others intended for so-called skin packaging (vacuum packaging in which the lidding film is highly deformable which allows it to adhere both to the supporting element 3 and to the product present on it like a skin).

This invention does not relate to the heat-sealing or sealing method and can therefore be implemented in any of the prior art heat-sealing and sealing technologies.

In general, in all prior art heat-sealing apparatuses the lidding film is heat-sealed to the supporting element 3 by two elements which are movable relative to each other, a supporting unit and a closing unit. The supporting unit and the closing unit are coupled at an intermediate zone of a forward movement path of the supporting elements along a packaging line. The supporting unit and the closing unit are movable relative to each other between a home position and an operating position. When they are in the home position, the supporting unit and the closing unit are at a distance from each other and allow both the positioning between them of a supporting element 3 to be sealed, and the removal of an already sealed supporting element 3. In contrast, when they are in the operating position, the closing unit and the supporting unit are clamped against each other to clamp between them both the supporting element 3 to be sealed and the relative lidding film. Generally, if necessary either means for creating the modified atmosphere or the vacuum, or means for heating the lidding film are associated with the supporting unit and/or the closing unit.

This invention relates to the way in which the supporting elements are fed to the heat-sealing device and removed from it.

According to the prior art, the supporting elements can be fed to the heat-sealing device in many different ways. However, in all of the prior art apparatuses, feeding always involves the intervention of mechanical movement means which pick up the supporting elements outside the heat-sealing device, carry them into it and release them onto the supporting unit. The mechanical movement means then move away from the heat-sealing device far enough to allow the supporting unit and the closing unit to adopt the operating position. At the end of the heat-sealing operation, when the supporting unit and the closing unit have returned to the home position, the mechanical movement means are re-activated, pick up the supporting elements from the supporting unit, and feed them to a conveying device downstream of the heat-sealing device.

However, all of these prior art technologies have several disadvantages. First, they are mechanically complex technologies.

Second, every time the size of the supporting element 3 has to be changed, as well as having to substitute the active parts of the supporting unit and of the closing unit, it is also necessary to substitute the active parts of the mechanical movement means. That has a considerable impact on the costs of the apparatuses.

In this context the technical purpose which forms the basis of this invention is to provide an apparatus for heat-sealing a lidding film to a supporting element 3 which overcomes the above-mentioned disadvantages.

In particular the technical purpose of this invention is to provide an apparatus for heat-sealing a lidding film to a supporting element 3 which simplifies the operations for loading and unloading the supporting elements in the, and from the, supporting unit.

A further technical purpose of this invention is to provide an apparatus for heat-sealing a lidding film to a supporting element 3 which simplifies the size change-over operations compared with prior art apparatuses.

The technical purpose specified and the aims indicated are substantially achieved by an apparatus for heat-sealing a lidding film to a supporting element 3, as described in the appended independent claim.

The other technical purposes indicated are achieved by at least one of the dependent claims.

Further features and the advantages of this invention will be more apparent from the detailed description of several preferred, non-limiting embodiments of an apparatus for heat-sealing a lidding film to a supporting element 3, illustrated with reference to the accompanying drawings, in which:

FIG. 7 is a schematic vertical section of a first type of heat-sealing device which is part of the apparatus according to this invention, in a first operating configuration;

FIG. 8 shows the heat-sealing device of FIG. 7 in a second operating configuration;

Figure 1:
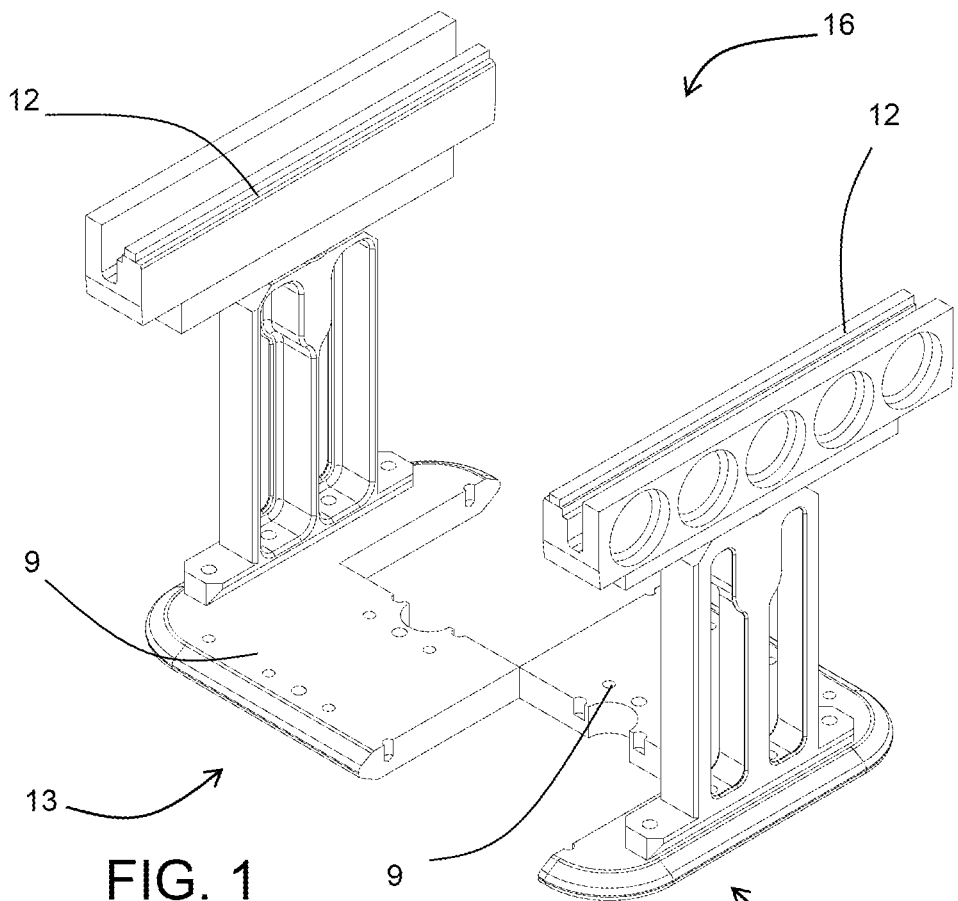
FIG. 1 is an axonometric view of a conveying unit which is part of the apparatus of this invention, in a first operating configuration.

With reference to the above-mentioned figures, the numeral 1 denotes in its entirety an apparatus for heat-sealing a lidding film 2 to a supporting element 3, made according to this invention.

The supporting elements 3, which can be used in the apparatus 1 according to this invention, can be of any type and can have any shape suitable for the purpose. In particular, they may be trays made of any material (paper, plastic, paper-plastic laminate, wood, glass, metal, etc.), with any shape (flat, concave, convex, round, square, rectangular, etc.), of any size (large, small, tall, short, etc.), divided or not divided into a plurality of separate compartments, provided with pre-cut perforation lines which in use allow separation into multiple pieces, etc.

The lidding film 2 may advantageously be made based on a plastic material. Although in the accompanying figures the supporting elements 3 illustrated are always empty for greater clarity, in real applications of this invention advantageously the lidding film 2 is applied to a supporting element 3 on which a product is present.

In its most general embodiment, the apparatus 1 comprises a structure 4 on which a movement track 5 and a heat-sealing device 6 are fitted.

The movement track 5 extends between an infeed zone and an outfeed zone and passes through an intermediate zone 7 at which it is associated with the heat-sealing device 6. FIGS. 11 to 26 illustrate the intermediate zone 7, whilst the infeed and outfeed zones are not illustrated in the accompanying figures.

Advantageously, in the preferred embodiments the movement track 5 is a planar motor conveyor plane.

As is known, a planar motor conveyor plane is the two-dimensional evolution of a linear motor, that is to say, a conveying device in which a plurality of magnetic shuttles 19 (in which, that is to say, at least one magnetic field generator, advantageously a permanent magnet, is fitted) are moved in a controlled way over a gliding plane, below which a large number of electromagnetic coils with selective activation is fitted. The movement of the magnetic shuttles 19 is obtained by powering each coil in a controlled way. Moreover, advantageously, in the planar motor conveyors it is possible to keep the magnetic shuttles 19 raised relative to the gliding plane, making them levitate all the time by means of the magnetic interactions between the coils and the permanent magnets. The principle which is the basis of the planar motor is therefore the same as that which is the basis of known magnetic levitation trains, but extended at two-dimensional level.

Some examples of planar motor conveyor devices are described for example in documents U.S. Pat. No. 9,202,719, EP 3707808, EP 3172156, EP 3172134, DE 102016224951, WO 01/59409 and WO 2016/012171, which should be consulted for further details.

In the context of this invention the definition planar motor conveyor plane will therefore indicate a device of the type described above, in which the magnetic shuttles 19 may have between two (simple translation along two Cartesian axes X and Y which are parallel to the gliding plane) and six degrees of freedom (in addition to the two already indicated, the possibility of varying the distance from the gliding plane by translating along an axis Z perpendicular to the axes X and Y, the possibility of rotating or oscillating about the axis Z, and the possibility of oscillating about each of the axes X and Y).

An example of a commercial planar motor conveyor plane usable in the context of this invention is that marketed under the "XPlanar" brand by the Italian company Beckhoff Automation S.r.l., with registered office in Limbiate. Another example of a commercial planar motor conveyor plane usable in the context of this invention is that marketed under the "Acopos 6D" brand by the Italian company B&R Automazione Industriale S.r.l., with registered office in Cesate, Italy, in which the gliding plane is freely configurable at will thanks to the fact that it is constituted of square modules, which can be connected to each other at will.

Since it is a known technology, in the context of this invention neither the structure 4 nor the operation of the planar motor conveyor plane will be described, only its use will be described.

At least one conveying unit 8 configured to support at least one supporting element 3 is associable with the movement track 5. The conveying unit 8 is associable with the movement track 5 for moving on it, conveying the supporting element 3 from the infeed zone to the heat-sealing device 6, and from the heat-sealing device 6 to the outfeed zone.

Advantageously, when the movement track 5 is a planar motor conveyor plane, the conveying unit 8 comprises at least one magnetic shuttle 19 movable by means of the planar motor, fitted in its own base 9.

In the preferred embodiments, the apparatus 1 comprises a plurality of independent conveying units 8, each configured to support at least one supporting element 3. The conveying units 8 may or may not all be the same.

For simplicity, hereinafter in any case reference will still often be made to a single conveying unit 8.

The heat-sealing device 6 comprises a supporting unit 10 and a closing unit 11. At least one of the supporting unit 10 and the closing unit 11 is movable, relative to the other, between a home position in which the two are at a distance from each other, and an operating position in which the supporting unit 10 and the closing unit 11 are coupled to clamp, in use, the lidding film 2 and a supporting element 3. In use, while the supporting unit 10 and the closing unit 11 are in the operating position, the heat-sealing device 6 applies the lidding film 2 to the supporting element 3; for that purpose, in the known way, the lidding film 2 is interposed between the supporting element 3 supported by the conveying unit 8 placed in the intermediate zone 7, and the closing unit 11. Film positioning can be performed either with suitable means capable of holding the film stretched out below the closing unit 11, or with a system capable of feeding individual sheets of film directly to the supporting unit 10 (all similarly to what normally happens in this type of apparatuses).

In some embodiments, the supporting unit 10 and the closing unit 11 are configured to clamp between them, when they are in the operating position, a single supporting element 3 with the relative lidding film 2.

In contrast, in other embodiments, the supporting unit 10 and the closing unit 11 are configured to simultaneously clamp between them, when they are in the operating position, a plurality of supporting elements 3. As is explained in more detail below, in this case the apparatus 1 may either be configured to simultaneously position a plurality of conveying units 8 at the intermediate zone 7 (for example one for each supporting element 3 simultaneously processable by the heat-sealing device 6), or may comprise conveying units 8 capable of simultaneously conveying the plurality of supporting elements 3 processable by the heat-sealing device 6 or sub-groups of them.

The conveying unit 8 defines at least one seat 16 for at least one supporting element 3 and comprises one or more active portions 12 configured to support from below the supporting element 3 positioned in the seat 16.

Figures 2, 3:
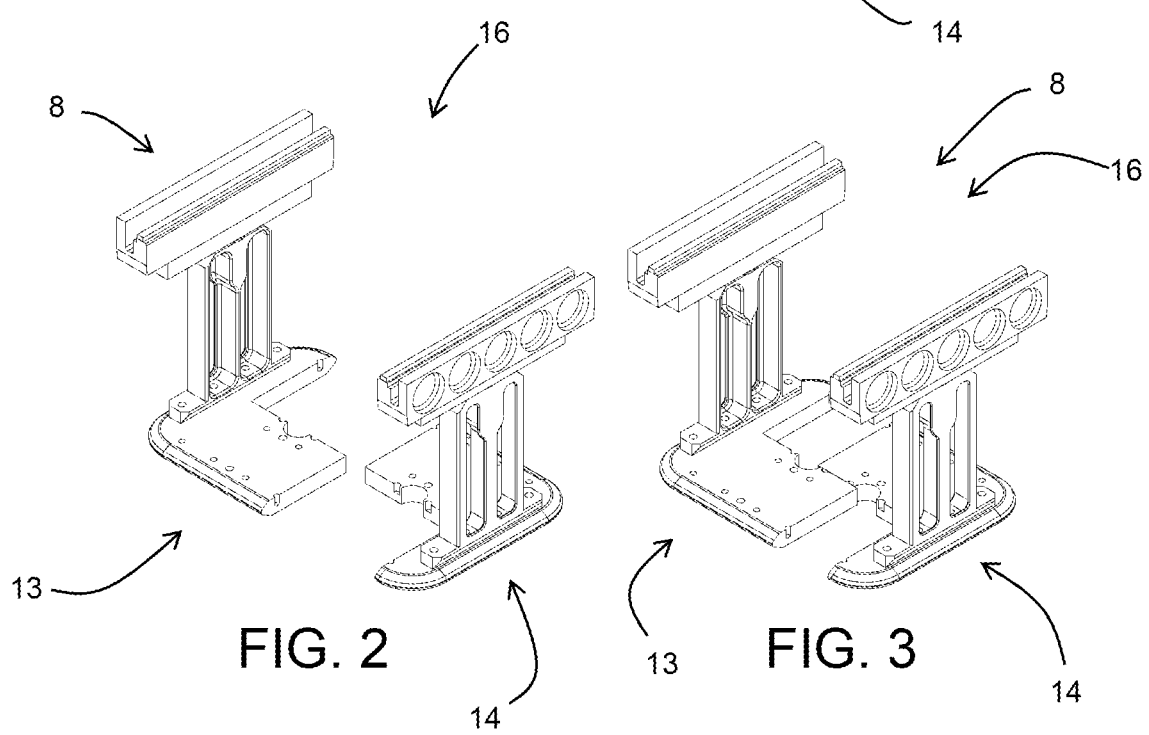
FIG. 2 is an axonometric view of the conveying unit of FIG. 1 in a second operating configuration.
FIG. 3 is an axonometric view of the conveying unit of FIG. 1 in a third operating configuration.

In some embodiments, the conveying unit 8 comprises two separate active portions 12, configured to support the supporting element 3 positioned in the seat 16 at two separate zones thereof. An example of this type is illustrated in FIGS. 1 to 3, in which the active portions 12 are configured to support from below the flange of the supporting element 3 in diametrically opposed positions. Advantageously, the active portions 12 are specular and have a longitudinal extent sufficient to guarantee stable support for the supporting element 3 on the conveying unit 8. The seat 16 is substantially defined by the two active portions 12 and by the space between them, which is necessary for housing the supporting element 3. In general, the active portions 12 are configured to interact with the supporting element 3 at least at its flange.

In some embodiments, the conveying unit 8 may be constituted of a single part and may have fixed dimensions.

In some embodiments the conveying unit 8 comprises a first part 13 and a second part 14 which can adopt a plurality of separate configurations relative to each other. An example of this type is given by the conveying unit 8 of FIGS. 1 to 3.

Each separate configuration of the first part 13 and of the second part 14 relative to each other corresponds to a different shape and/or size of the seat 16 for the supporting element 3. In fact, advantageously, a first active portion 12 is associated with the first part 13 and a second active portion 12 is associated with the second part 14, so that the first active portion 12 and the second active portion 12 adopt different positions relative to each other in each configuration of the first part 13 and of the second part 14 relative to each other.

In the preferred embodiments, in which the movement track 5 is a planar motor conveyor plane, both the first part 13 and the second part 14 comprise at the bottom of them at least one magnetic shuttle 19 (not illustrated in the accompanying figures) movable by means of the planar motor. The magnetic shuttles 19 of the first part 13 and of the second part 14 can be moved independently to vary the configuration of the first part 13 and of the second part 14, whereas they can be moved in a coordinated way, keeping the configuration of the first part 13 and the second part 14 relative to each other fixed, to move the supporting element 3 along the movement track 5.

FIGS. 1 to 3 show the same first part 13 and second part 14 at three different distances from each other, which correspond to three different distances from each other of the first active portion 12 and of the second active portion 12.

Figure 4:
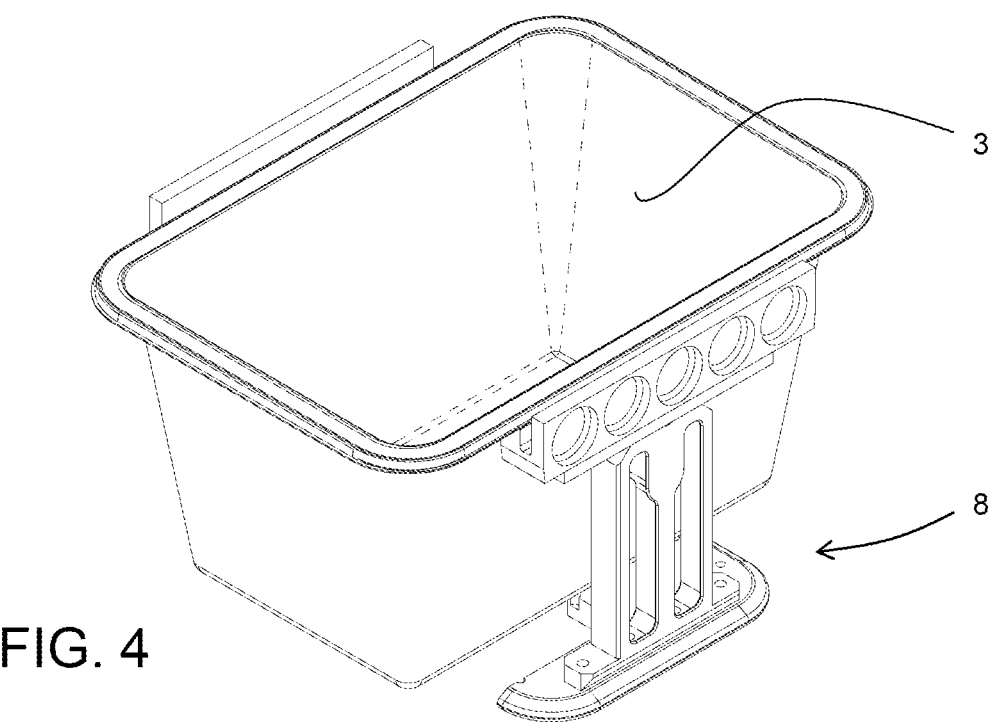
FIG. 4 is an axonometric view of the same conveying unit of FIG. 1 conveying a different supporting element 3.
Figure 5:
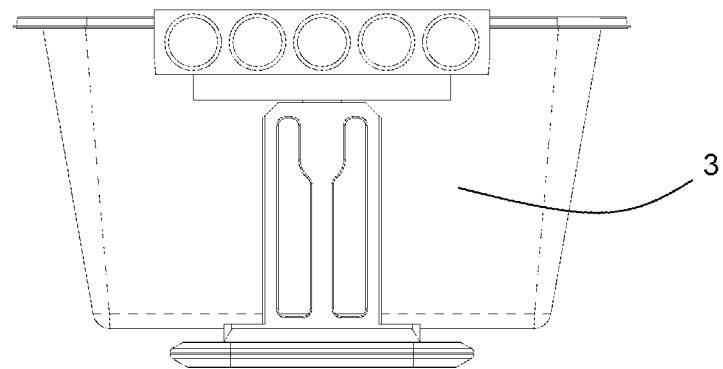
FIG. 5 is a front view of the conveying unit of FIG. 4.
Figure 6:
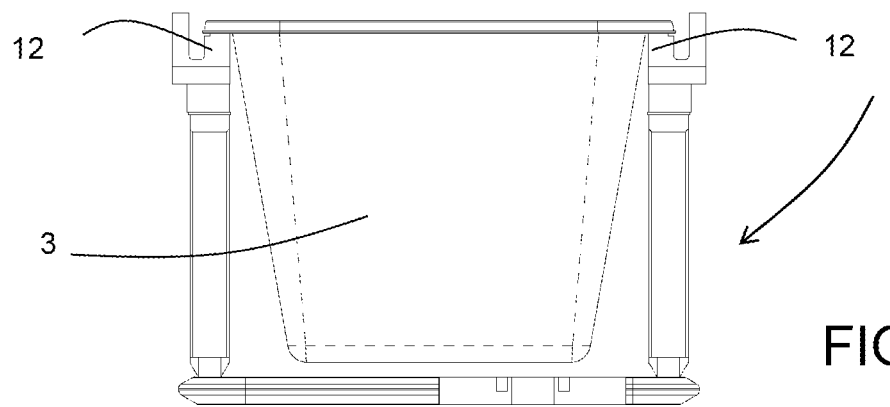
FIG. 6 is a side view of the conveying unit of FIG. 4.
Figures 9, 10:
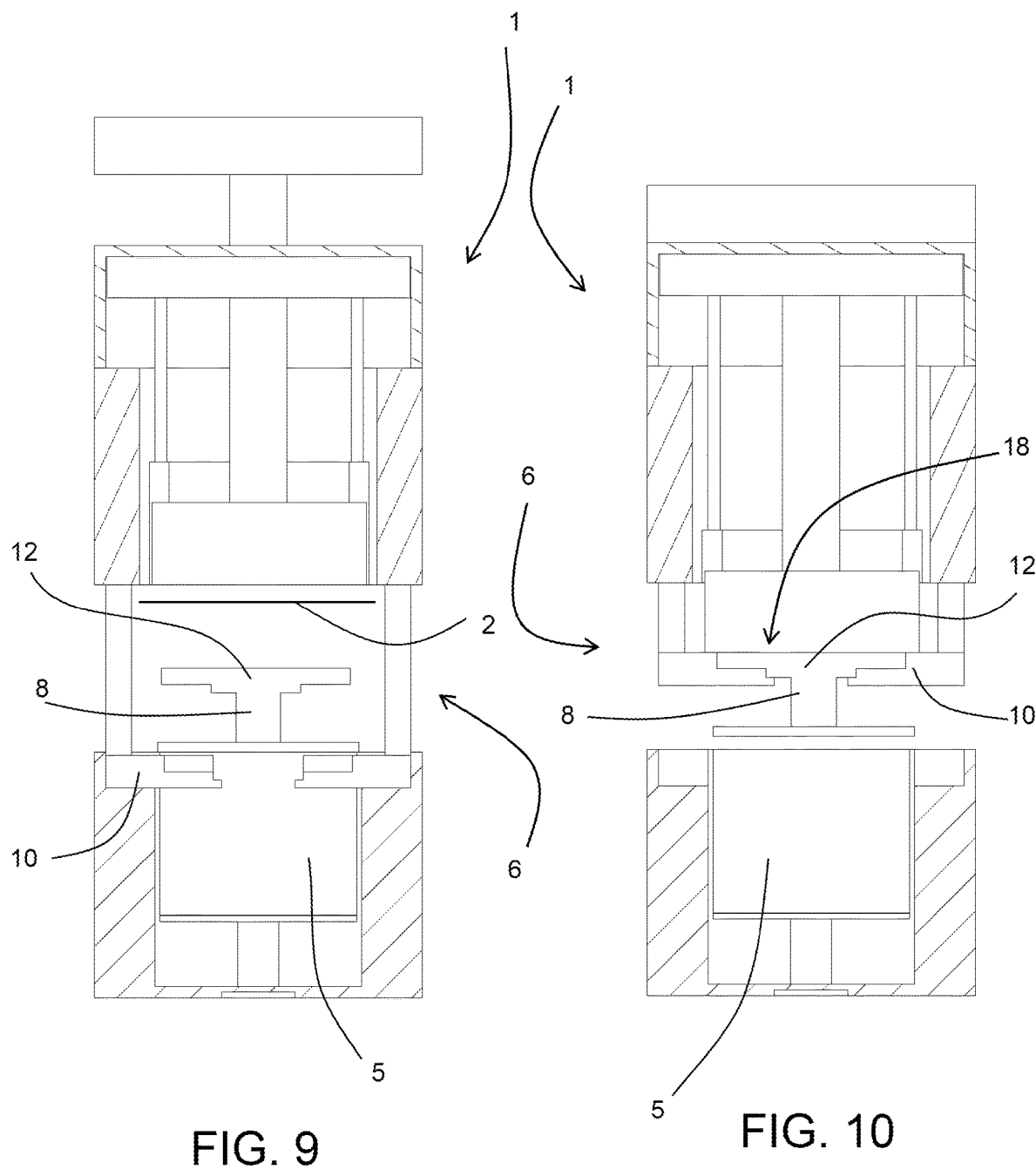
FIGS. 9 and 10 shows a second type of heat-sealing device, in two operating configurations similar to those of FIGS. 7 and 8.

FIGS. 4 to 6 show the conveying unit 8 in the configuration of FIG. 1, on which a supporting element 3 with the maximum possible height for that conveying unit 8 is positioned.

Advantageously, in the embodiments which involve the use of a movement track 5 with planar motor, the first part 13 and the second part 14 may be mechanically disengaged, and the planar motor may be controlled in such a way what the first part 13 and the second part 14 adopt and maintain each configuration relative to each other exclusively by means of the planar motor itself.

According to an innovative aspect of this invention, the conveying unit 8 when located in the intermediate zone 7 is interposed between the supporting unit 10 and the closing unit 11 which are positioned in the home position. Advantageously, when it is located in the intermediate zone 7, the conveying unit 8 may be positioned in such a way that the supporting element 3 is vertically aligned with an underlying housing 15 intended for it, made in the supporting unit 10.

In some embodiments, the conveying unit 8 defines a single seat 16 for housing a single supporting element 3. In contrast, in other embodiments the conveying unit 8 defines a plurality of seats 16 for simultaneously housing a plurality of separate supporting elements 3. In the latter case, the conveying unit 8 comprises one or more active portions 12 for each seat 16. FIG. 1 shows an example of a conveying unit 8 which defines a single seat 16, whilst FIG. 27 shows an example of a conveying unit 8 which defines a plurality of seats 16.

Even when the conveying unit 8 defines a plurality of seats 16, it is possible that the conveying unit 8 may comprise a first part 13 and a second part 14 which can adopt a plurality of separate configurations relative to each other. This is not the case in FIG. 27, in which the dimensions of the seats 16 are fixed.

Figure 27:
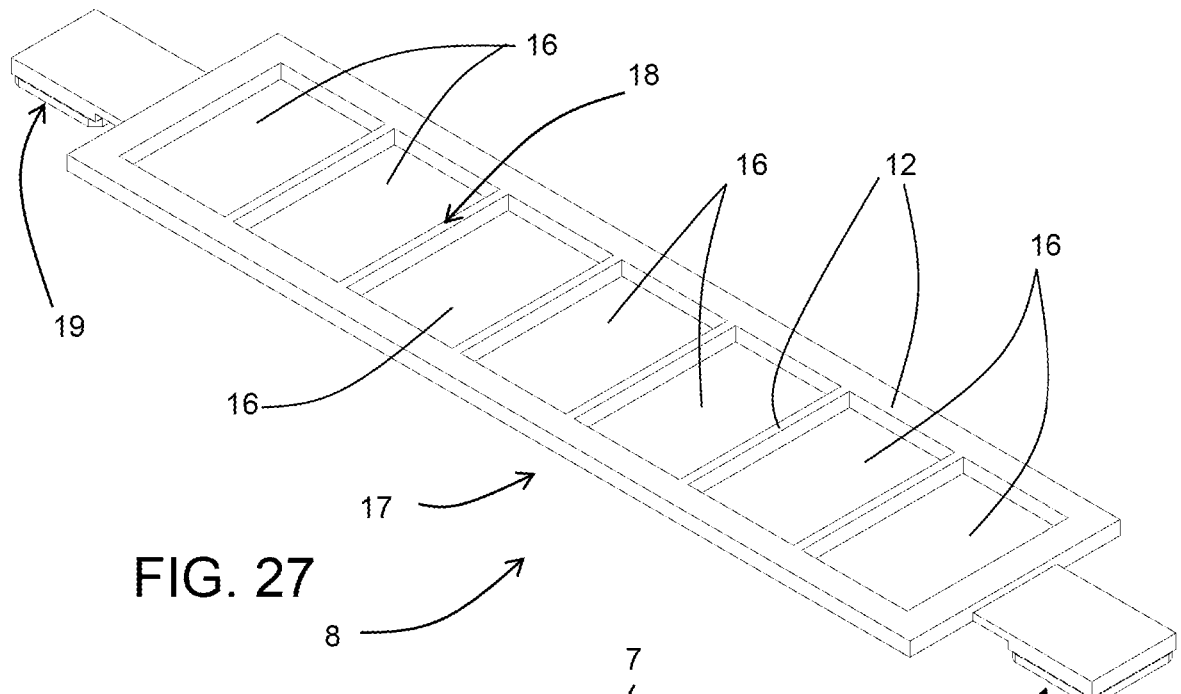
FIG. 27 is an axonometric view of a different embodiment of a conveying unit which is part of an apparatus made according to this invention.

Moreover, in some embodiments, the conveying unit 8 may comprise two magnetic shuttles 19, even if they cannot modify their position relative to each other, as illustrated for example in FIG. 27, in which the various seats 16 provided for the supporting elements 3 are aligned and connected in such a way as to constitute a single body 17, and in which that single body 17 is supported by two magnetic shuttles 19 which are each fixed to one end of it. In some embodiments the conveying unit 8 may also comprise more than two magnetic shuttles 19, just as it may comprise more than two parts which can adopt separate configurations relative to each other.

According to a further innovative aspect of this invention, clamping of the supporting element 3 and of the lidding film 2 against the closing unit 11 is performed by a clamping unit which comprises both the supporting unit 10 and the one or more active portions 12 of the conveying unit 8. In fact, the active portions 12 of the conveying unit 8 are shaped in such a way that they can couple to the supporting unit 10 thereby forming the clamping unit.

According to a further innovative aspect of this invention, with the conveying unit 8 positioned in the intermediate zone 7, during an activation of the heat-sealing device 6 the one or more active portions 12 couple to the supporting unit 10 to define with it the clamping unit.

In some embodiments, the clamping unit comprises an operating part 18 which has an annular shape. If the conveying unit 8 comprises a plurality of separate active portions 12, or a single active portion 12 with non-annular shape, the operating part 18 of the clamping unit is constituted partly of the one or more active portions 12 and partly of the supporting unit 10.

In contrast, when the conveying unit 8 comprises a single active portion 12 with annular shape which completely surrounds the seat 16 for the supporting element 3, the operating part 18 of the clamping unit is advantageously constituted of that single active portion 12.

The coupling between the active portions 12 and the supporting unit 10 may be made in various different ways.

In some embodiments, the active portions 12 remain stationary above the supporting unit 10 and engage in corresponding housings made in the supporting unit 10, during a shifting of the supporting unit 10 towards the closing unit 11. In more detail, the supporting unit 10 may be movable between the home position and the operating position, and the passage of the supporting unit 10 from the home position to the operating position causes the mechanical coupling between the one or more active portions 12 of the conveying unit 8 placed in the intermediate zone 7 and the supporting unit 10. FIGS. 7 to 10 schematically show two possible embodiments, a first embodiment in which the supporting unit 10 is fixed to a lower part of the structure 4 and is pushed upwards (FIGS. 7 and 8), and a second embodiment in which in contrast the supporting unit 10 is fixed to an upper part of the structure 4 which also supports the closing unit 11; in this case the supporting unit 10 is pulled upwards during its movement towards the operating position.

In contrast, in some embodiments, the conveying unit 8 is lowered towards the supporting unit 10 until the active portions 12 engage in the housings made in the supporting unit 10.

In more detail, in some embodiments, at the intermediate zone 7 at least one of the supporting unit 10 and the movement track 5 is movable relative to the other. When the conveying unit 8 is located in the intermediate zone 7, the relative shifting of the supporting unit 10 and of the movement track 5, causes the mechanical coupling between the supporting unit 10 and the one or more active portions 12 of the conveying unit 8; as a result of that coupling the clamping unit is defined.

Advantageously, it may be the case that, at the intermediate zone 7, the movement track 5 is movable between a raised position in which it allows the conveying unit 8 both to reach the intermediate zone 7 (before sealing) and to come out of the intermediate zone 7 (after sealing), and a lowered position. The shifting of the movement track 5 from the raised position to the lowered position causes the downward shifting of the conveying unit 8, and the consequent mechanical coupling between the one or more active portions 12 of the conveying unit 8 and the supporting unit 10.

FIGS. 11 to 26 illustrate two ways of coupling described above, between the conveying unit 8 and the supporting unit 10, with reference, respectively, to a heat-sealing device 6 configured to process a plurality of supporting elements 3 which are aligned in a single row (FIGS. 11 to 18) and a heat-sealing device 6 configured to process a plurality of supporting elements 3 which are aligned in two rows (FIGS. 19 to 26).

Figure 11:
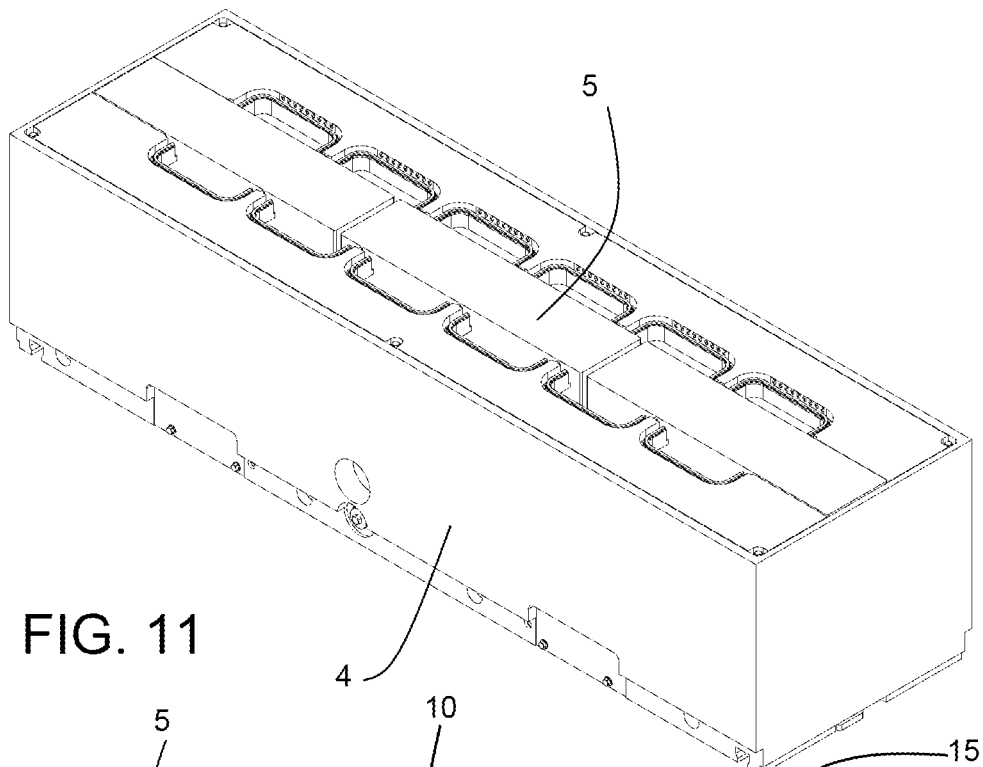
FIG. 11 is an axonometric view and in a first operating configuration, of a first embodiment of a supporting unit and a movement track which is part of the apparatus according to this invention.
Figure 12:
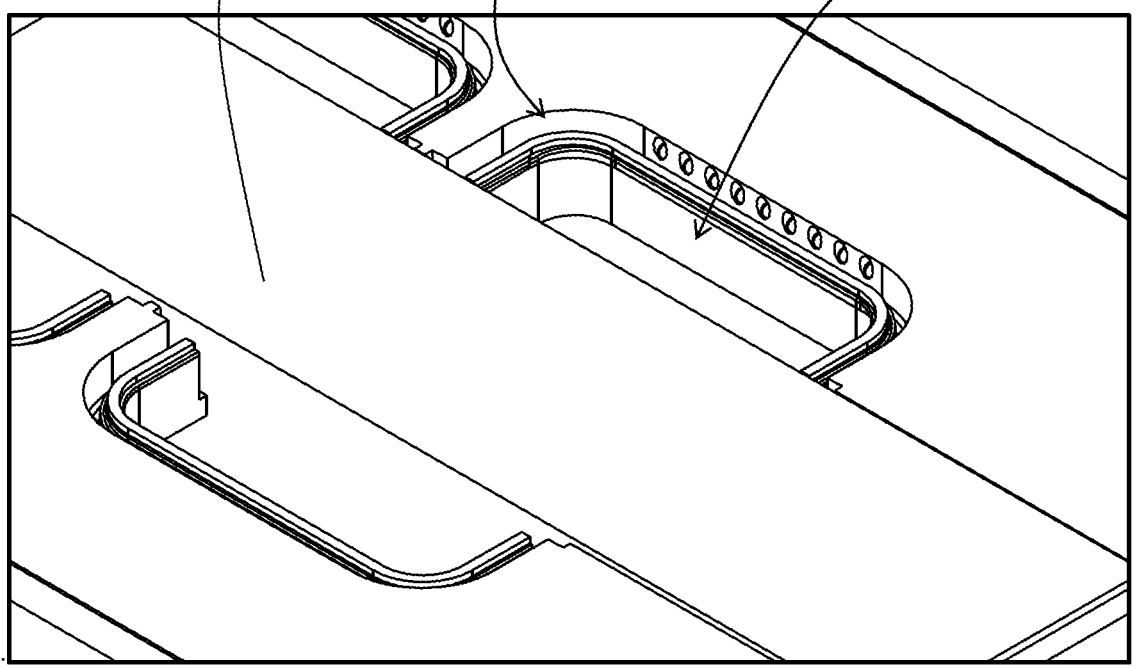
FIG. 12 is an enlarged view of a detail of FIG. 11.

FIG. 11 shows the supporting structure 4 in which both a stretch of the movement track 5, and the supporting unit 10 are fitted. The latter is in a lower position than the movement track 5, so that it does not interfere with the forward movement of the conveying units 8 and of the supporting elements 3; that is achieved thanks to the fact that the movement track 5 is in its own raised position.

The supporting unit 10 defines six housing 15 aligned along the movement track 5, which are intended to receive six separate supporting elements 3 (similarly the closing unit 11 will be configured to seal them all).

Figure 13:
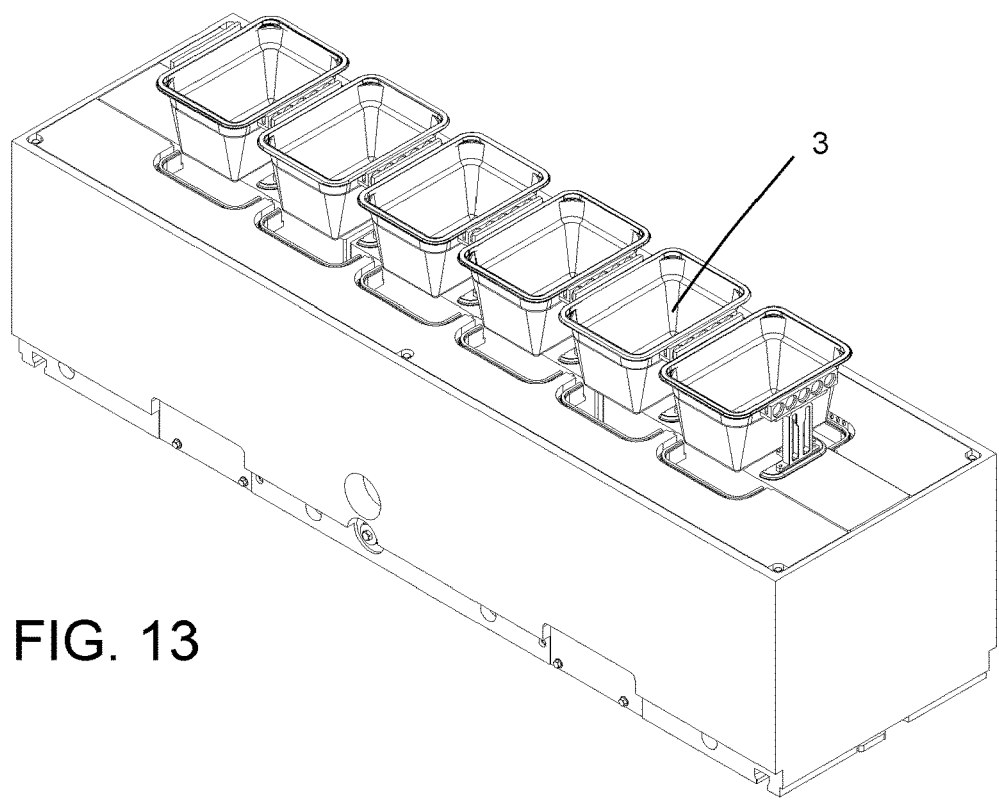
FIG. 13 is an axonometric view of the supporting unit and the movement track of FIG. 11 with an associated plurality of conveying units.
Figure 14:
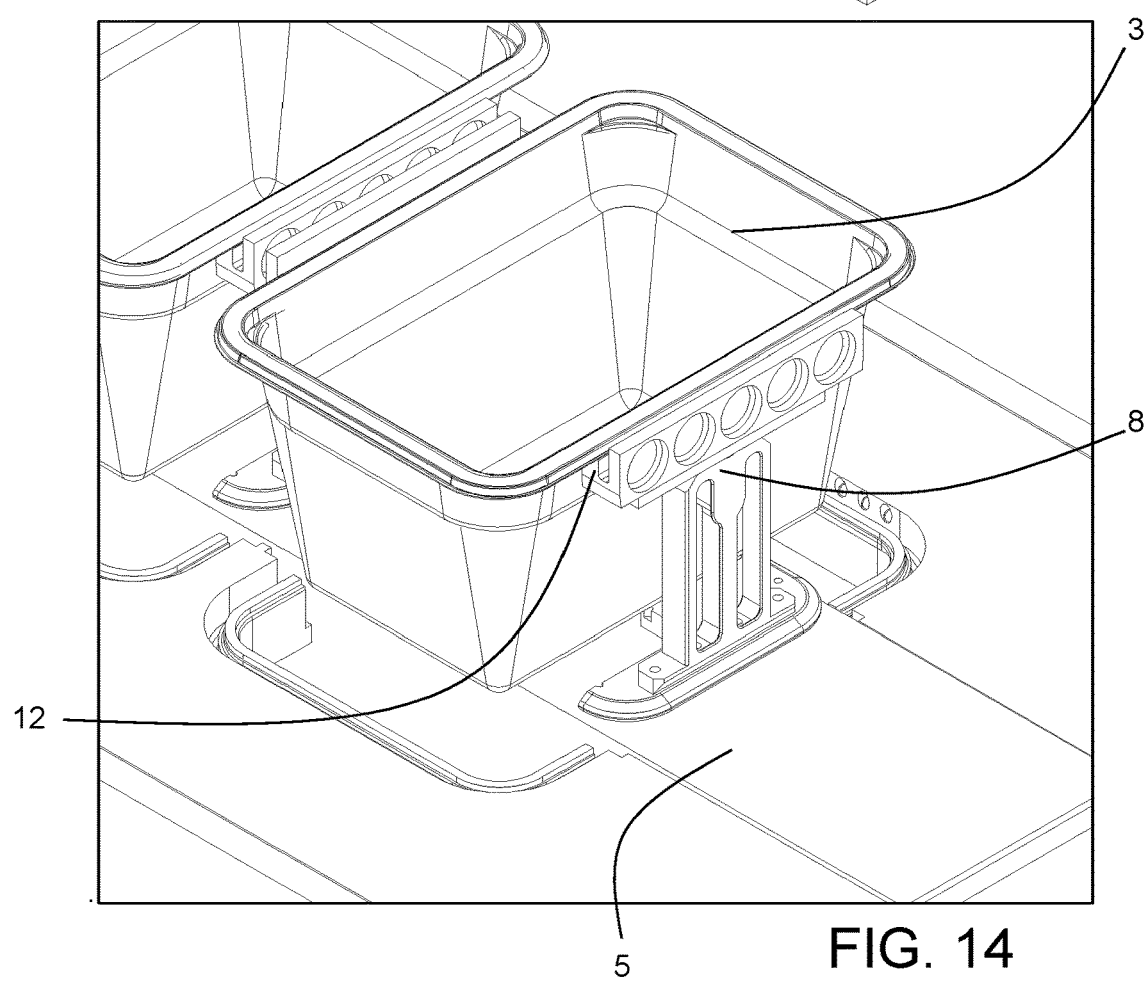
FIG. 14 is an enlarged view of a detail of FIG. 13.
Figure 15:
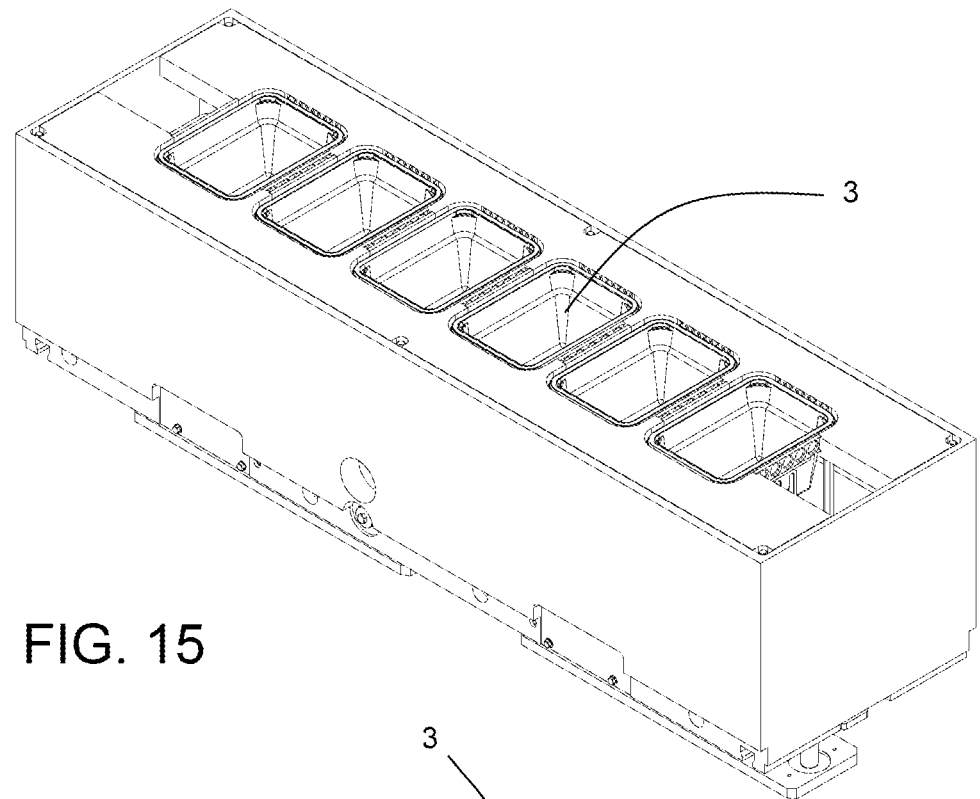
FIG. 15 is an axonometric view of the supporting unit and the movement track of FIG. 13, in a second operating configuration.
Figure 16:
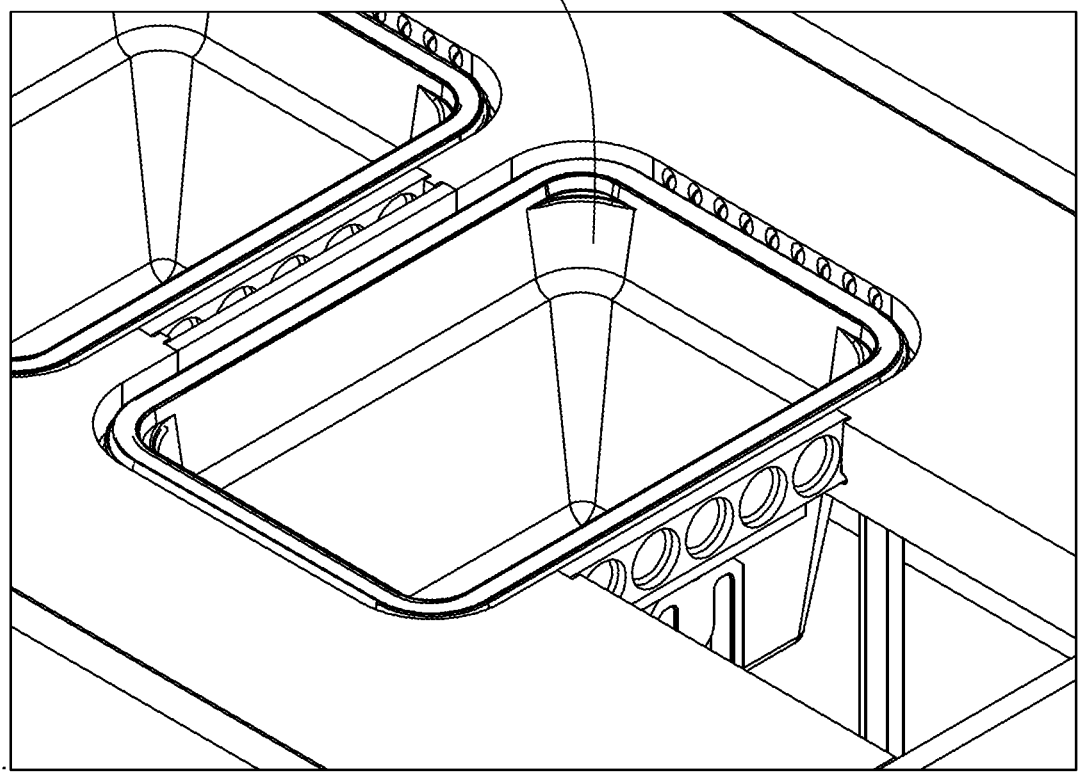
FIG. 16 is an enlarged view of a detail of FIG. 13.
Figure 17:
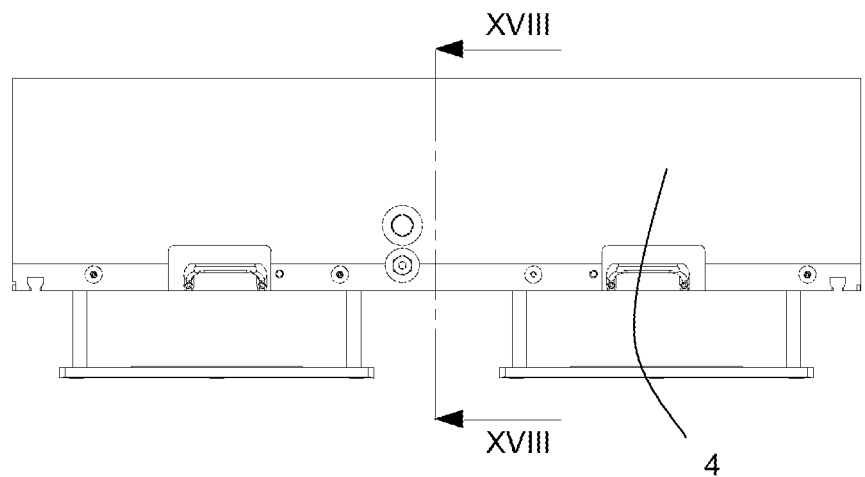
FIG. 17 is a side view of the elements of FIG. 15.

FIG. 13 shows the moment when six different conveying units 8, after having been moved forward along the movement track 5, are each positioned at one of the housings 15.

Figure 18:
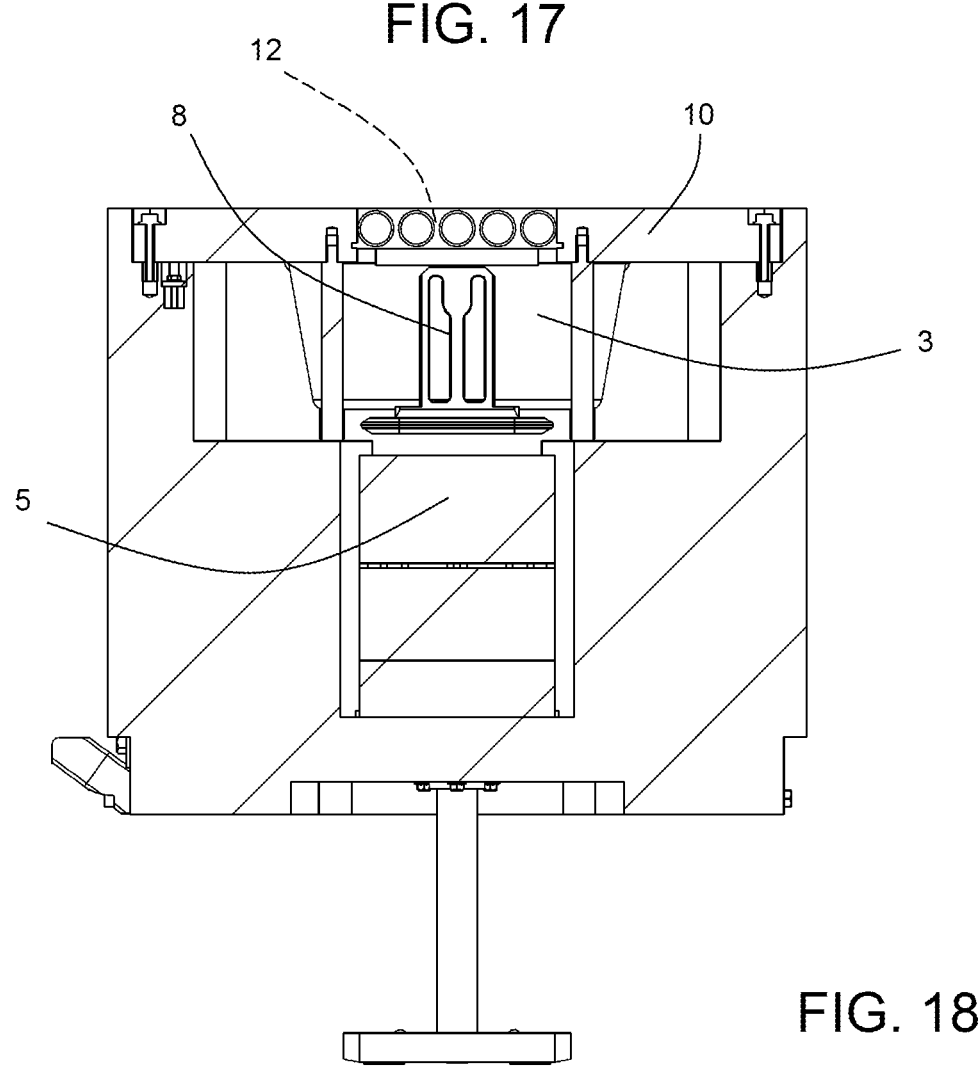
FIG. 18 is a cross-section of the elements of FIG. 17 according to the line XVIII-XVIII.

At that point the movement track 5 is shifted from the raised position to the lowered position (FIG. 15) and the active portions 12 of each conveying unit 8 couple to the supporting unit 10 to define the clamping unit. As can be seen in the detail of FIG. 18, the movement track 5 is advantageously lowered enough to move it away from the base of the conveying units 8 hooked to the supporting unit 10.

Figure 19:
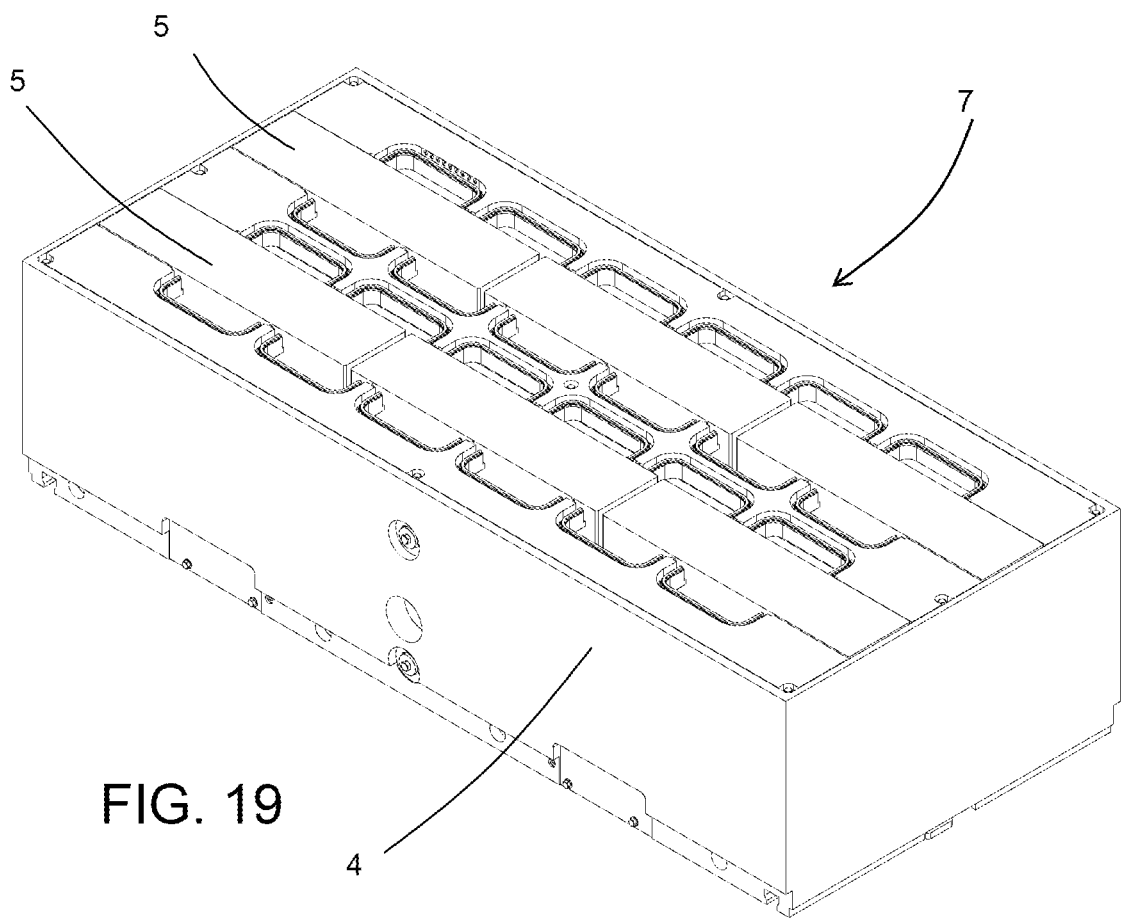
FIG. 19 is an axonometric view of a second embodiment of a supporting unit and a movement track which is part of the apparatus according to this invention, in a first operating configuration.
Figure 20:
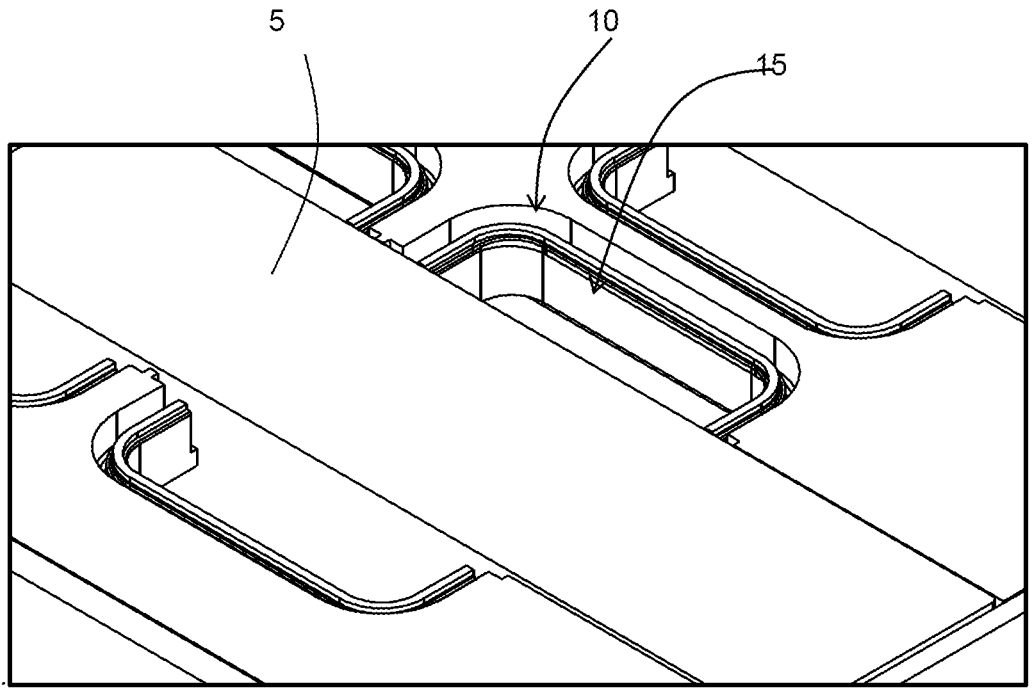
FIG. 20 is an enlarged view of a detail of FIG. 19.
Figure 21:
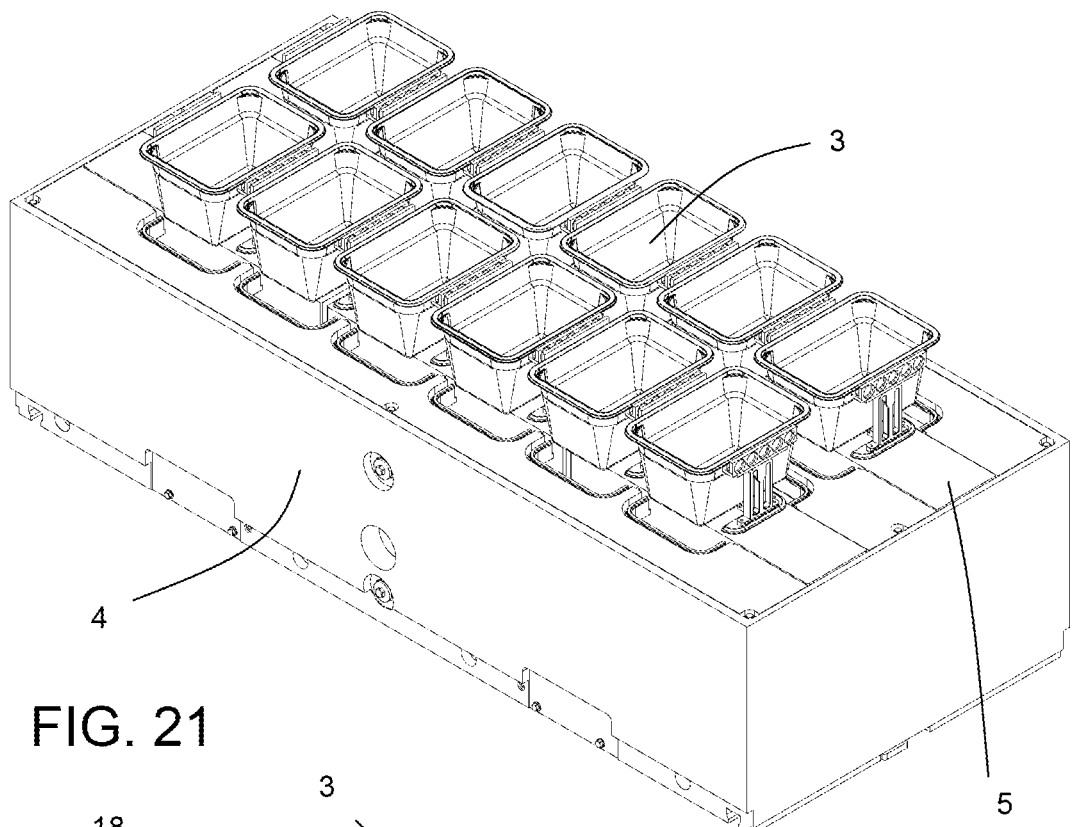
FIG. 21 is an axonometric view of the supporting unit and the movement track of FIG. 19, with an associated plurality of conveying units.
Figure 22:
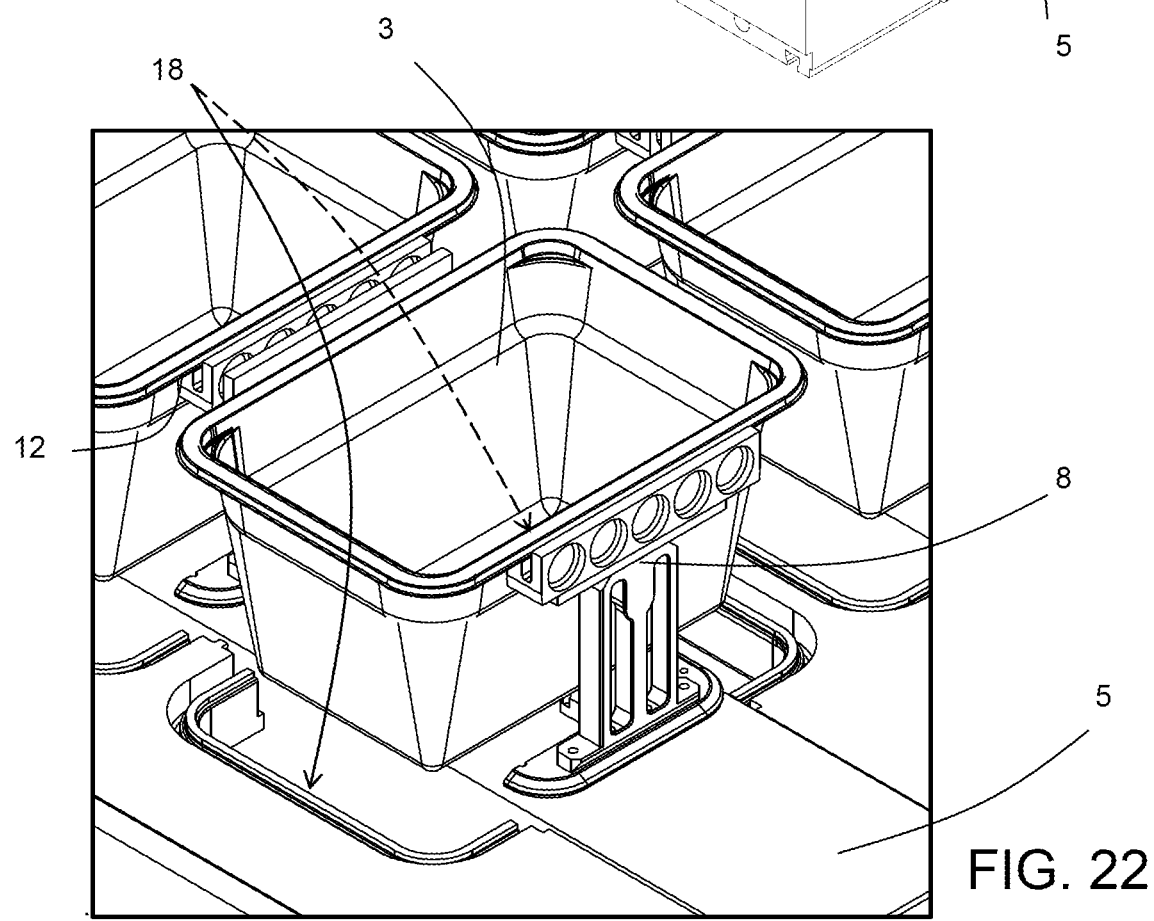
FIG. 22 is an enlarged view of a detail of FIG. 21.
Figure 23:
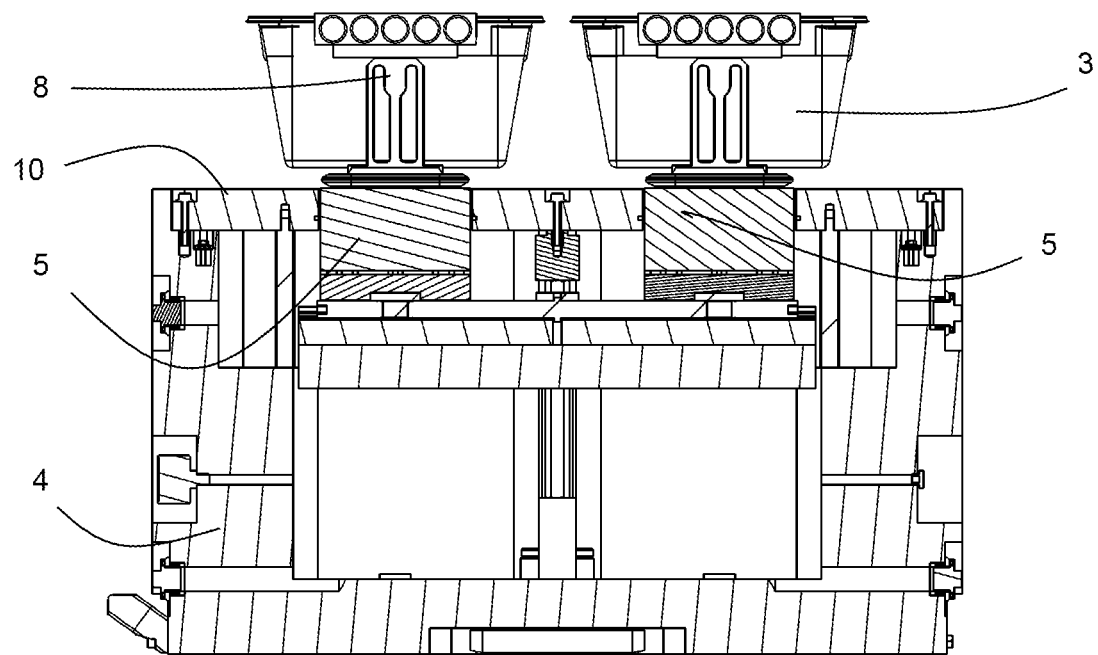
FIG. 23 is a cross-section of the elements of FIG. 21 sectioned in a similar way to FIG. 18.
Figure 24:
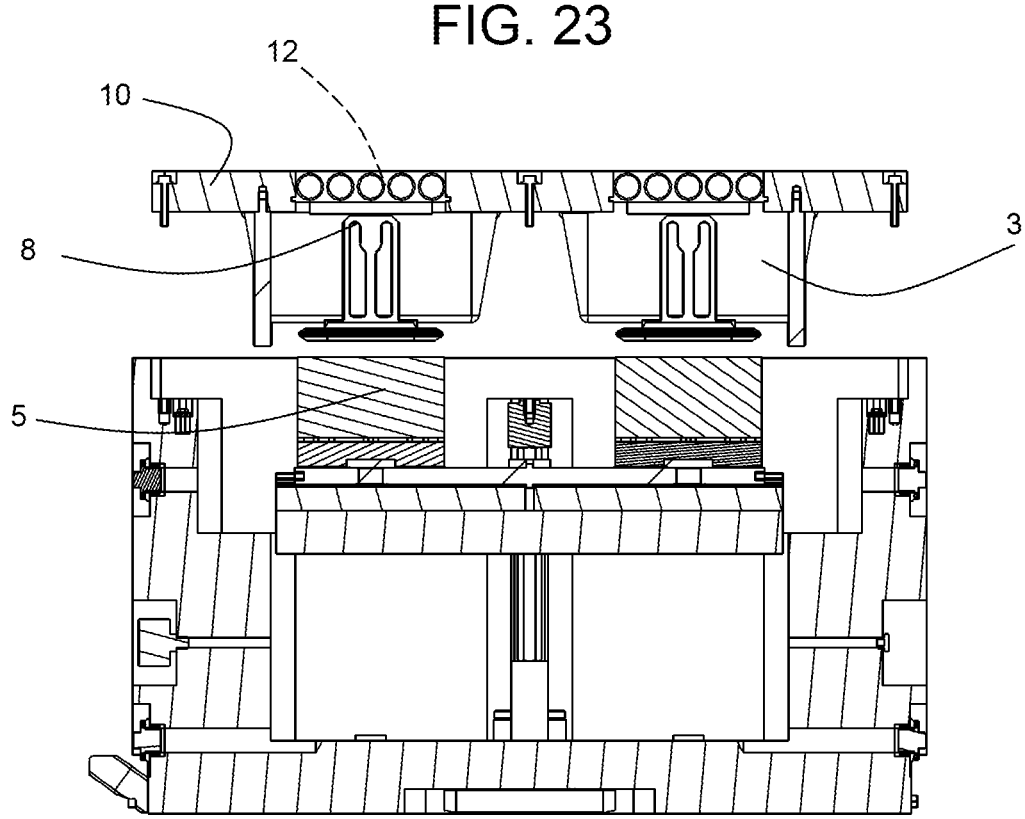
FIG. 24 is an axonometric view of the supporting unit and the movement track of FIG. 21 in a second operating configuration.
Figure 25:
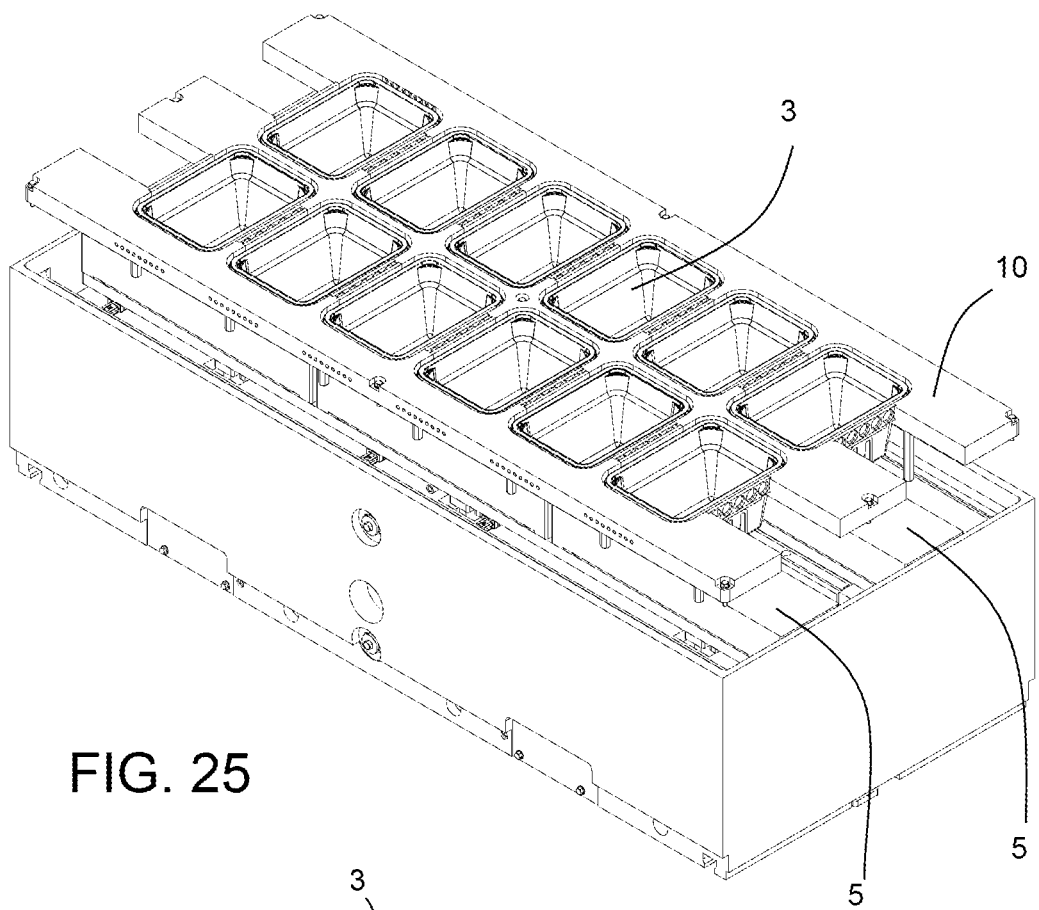
FIG. 25 is an enlarged view of a detail of FIG. 24.
Figure 26:
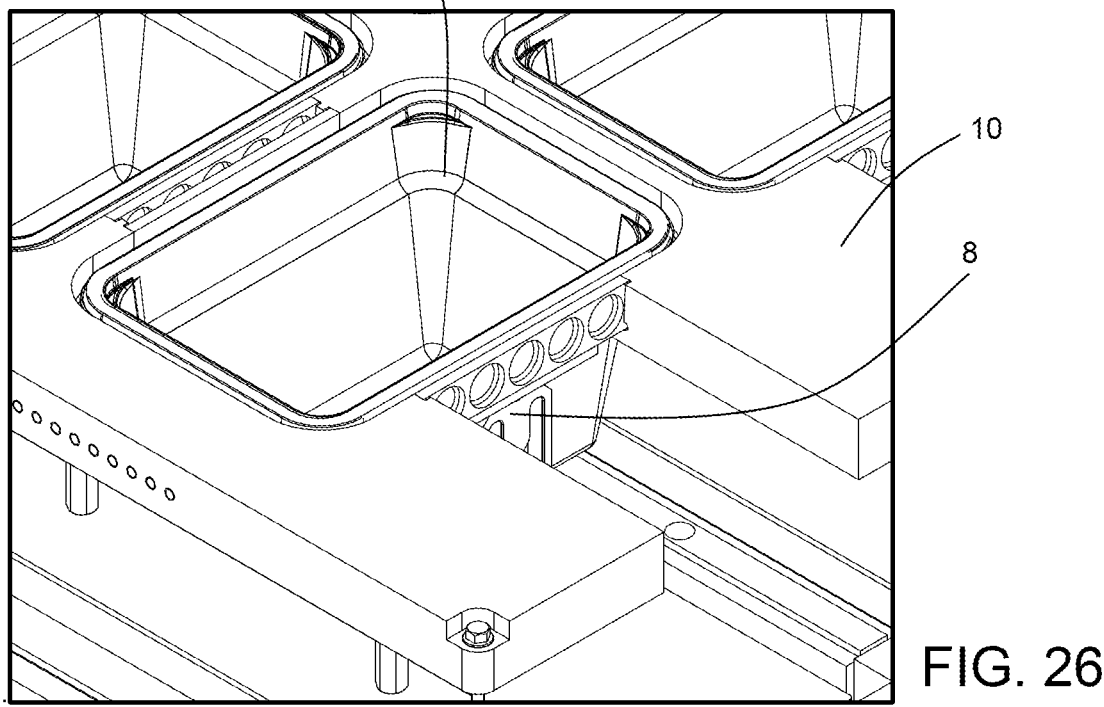
FIG. 26 is a cross-section of the elements of FIG. 24 sectioned in a similar way to FIG. 18.

FIGS. 19 and 21 show two situations similar to those of FIGS. 11 and 13, this time with reference to a supporting unit 10 which defines two parallel rows of six housings 15, a branch of the movement track 5 being associated with each row.

Unlike what was described for FIGS. 11 to 18, in the case of the apparatus 1 of FIG. 19 the movement track 5 is fixed relative to the structure 4, whilst it is the supporting unit 10 which can move from the home position (FIG. 19) to the operating position (FIG. 25), during the movement hooking the active portions 12 of the conveying units 8 and lifting them relative to the movement track 5.

Figure 28:
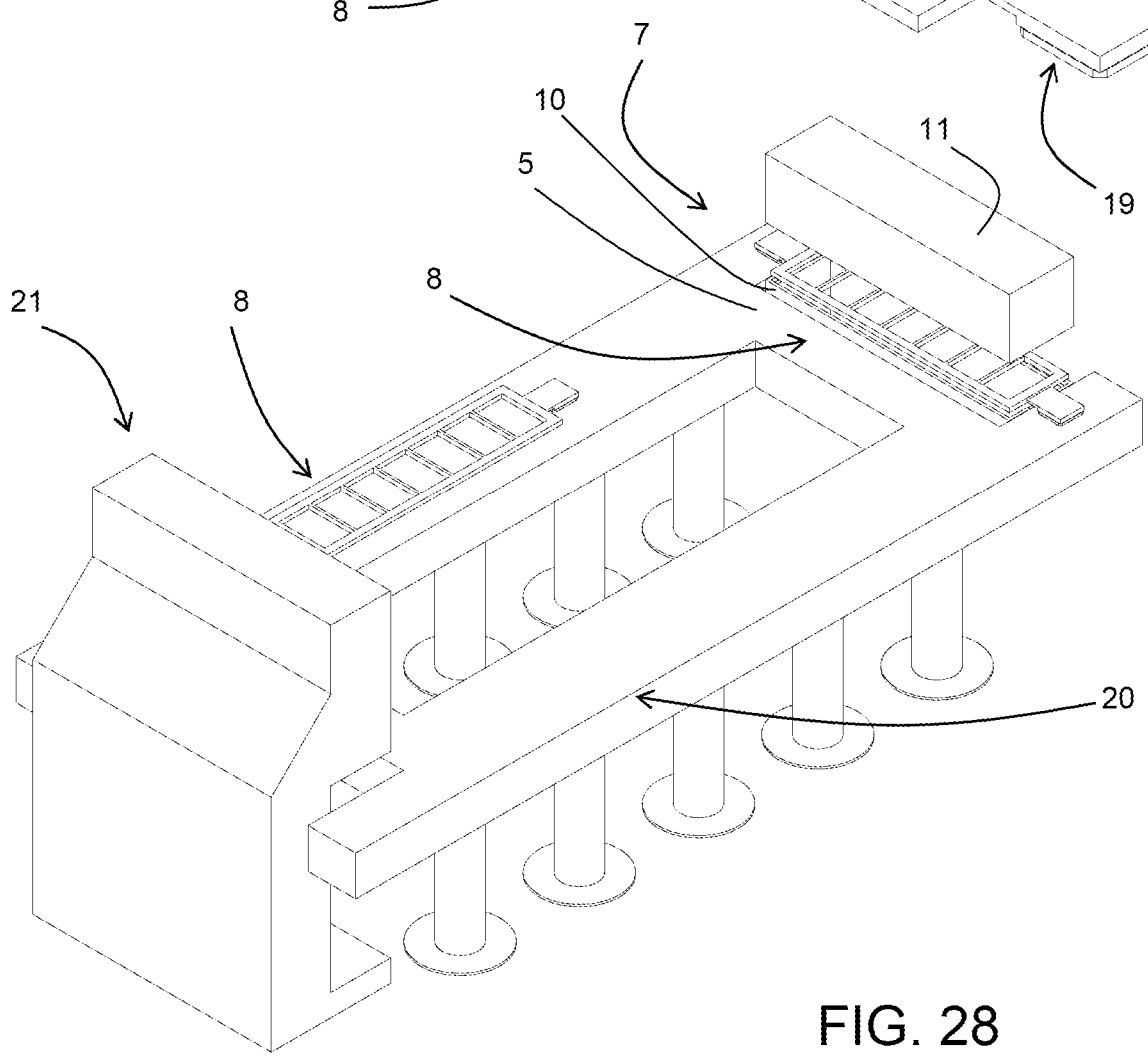
FIG. 28 is an axonometric view of an apparatus according to a further embodiment of this invention, which comprises two conveying units of the type illustrated in FIG. 27.

According to a further innovative aspect of this invention, schematically illustrated in FIG. 28, the movement track 5 is part of a larger forward movement track 20 of a plant to which the apparatus 1 belongs. The forward movement track 20 is advantageously made with the same technology as the movement track 5 (for example with planar motor), in such a way that the conveying units 8 can be used without interruption to convey the supporting elements 3 one after another in a plurality of processing stations 21 which are present in the plant. For example, positioned along the forward movement track 20 there may be a station for loading the supporting elements 3 onto the conveying units 8, one or more stations for loading the products onto the supporting elements 3, the heat-sealing station, and a labelling station.

This invention brings important advantages.

Thanks to this invention, an apparatus for heat-sealing a lidding film to a supporting element has been defined, which considerably simplifies the operations for loading and unloading the supporting elements in and from the heat-sealing device compared with prior art apparatuses.

Furthermore, thanks to this invention it has been possible to define an apparatus for heat-sealing a lidding film to a supporting element which simplifies the size change-over operations compared with prior art apparatuses; in fact, it is sufficient to appropriately modify the heat-sealing device and to adjust or substitute (depending on the embodiments) the individual conveying units, without the need to intervene on complex forward movement systems for the supporting elements as in the prior art apparatuses.

Finally, it should be noticed that this invention is relatively easy to produce and that even the cost linked to implementing the invention is not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for heat-sealing a lidding film (2) to a supporting element (3) on which a product is present, the apparatus (1) comprising:
   a structure (4);
   a movement track (5) which is fitted on the structure (4) and which extends between an infeed zone and an outfeed zone;
   a heat-sealing device (6) which is fitted on the structure (4), along the movement track (5), and which comprises a supporting unit (10) and a closing unit (11); at least one of the supporting unit (10) and the closing unit (11) being movable, relative to the other, between a home position in which they are at a distance from each other, and an operating position in which the supporting unit (10) and the closing unit (11) are coupled to clamp, in use, the lidding film (2) and the supporting element (3);
   a conveying unit (8) which is configured to support the supporting element (3) and is associable with the movement track (5) for moving on said movement track (5), conveying the supporting element (3), from the infeed zone to an intermediate zone (7) at which the heat-sealing device (6) is located, and from the intermediate zone (7) to the outfeed zone;
   wherein:
   the conveying unit (8) defines a seat (16) for the supporting element (3) and comprises one or more active portions (12) configured to support from below the supporting element (3) positioned in the seat (16);
   when the conveying unit (8) is located in the intermediate zone (7), during an activation of the heat-sealing device (6) the one or more active portions (12) couple to the supporting unit (10) to define with said supporting unit (10) a clamping unit for clamping the supporting element (3) against the closing unit (11); and
   the clamping unit has an operating part (18) with annular shape which is constituted partly of the one or more active portions (12) and partly of the supporting unit (10).

2. The apparatus according to claim 1 wherein the movement track (5) is a planar motor conveyor plane and wherein the conveying unit (8) comprises at least one magnetic shuttle (19) movable by means of the planar motor.

3. The apparatus according to claim 2, wherein the conveying unit (8) comprises a first part (13) and a second part (14) which adopt a plurality of separate configurations relative to each other each corresponding to a different shape and/or size of the seat (16) for the supporting element (3), a first active portion (12) being associated with the first part (13) and a second active portion (12) being associated with the second part (14), and wherein the first active portion (12) and the second active portion (12) adopt different positions relative to each other in each of said configurations of the first part (13) and of the second part (14) relative to each other, and wherein both the first part (13), and the second part (14), comprise at least one magnetic shuttle (19) movable by means of the planar motor.

4. The apparatus according to claim 3 wherein the first part (13) and the second part (14) are mechanically disengaged, and wherein the first part (13) and the second part (14) adopt and maintain each configuration relative to each other exclusively by means of the planar motor of the movement track (5).

5. The apparatus according to claim 1 wherein the conveying unit (8) comprises two separate active portions (12), configured to support the supporting element (3) positioned in the seat (16) at two separate zones thereof.

6. The apparatus according to claim 5 wherein the conveying unit (8) comprises a first part (13) and a second part (14) which adopt a plurality of separate configurations relative to each other each corresponding to a different shape and/or size of the seat (16) for the supporting element (3), a first active portion (12) being associated with the first part (13) and a second active portion (12) being associated with the second part (14), and wherein the first active portion (12) and the second active portion (12) adopt different positions relative to each other in each of said configurations of the first part (13) and of the second part (14) relative to each other.

7. The apparatus according to claim 1 wherein the conveying unit (8) comprises a single active portion (12) configured to support the supporting element (3) positioned in the seat (16).

8. The apparatus according to claim 1, wherein, at the intermediate zone (7), at least one of the supporting unit (10) and the movement track (5) is movable relative to the other and wherein, when the conveying unit (8) is located in the intermediate zone (7), a relative shifting of the supporting unit (10) and of the movement track (5), causes a mechanical coupling between the supporting unit (10) and the one or more active portions (12) of the conveying unit (8), as a result of which the clamping unit is defined.

9. The apparatus according to claim 8 wherein at the intermediate zone (7) the movement track (5) is movable between a raised position in which it allows the conveying unit (8) to reach the intermediate zone (7) and to come out of the intermediate zone (7), and a lowered position, the shifting of the movement track (5) from the raised position to the lowered position causing the mechanical coupling between the one or more active portions (12) of the conveying unit (8) placed in the intermediate zone (7) and the supporting unit (10).

10. The apparatus according to claim 8, wherein the supporting unit (10) is movable between the home position and the operating position, and wherein the passage of the supporting unit (10) from the home position to the operating position causes the mechanical coupling between the one or more active portions (12) of the conveying unit (8) placed in the intermediate zone (7) and the supporting unit (10).

11. The apparatus according to claim 1, wherein the conveying unit (8) defines a plurality of seats (16) for housing a plurality of separate supporting elements (3), and comprises one or more active portions (12) for each seat (16).

12. The apparatus according to claim 1, wherein the supporting unit (10) and the closing unit (11) are configured to simultaneously clamp, in use and when they are in the operating position, a plurality of supporting elements (3).

13. The apparatus according to claim 1 wherein the movement track (5) is part of a forward movement track (20) of a plant in which the apparatus (1) is installed, wherein along said forward movement track (20) there are one or more further processing stations (21) for the supporting elements (3), and wherein the conveying unit (8) is also used to move the supporting elements (3) along the forward movement track (20) of the plant.

14. The apparatus according to claim 1 comprising a plurality of independent conveying units (8).

* * * * *